(12) United States Patent
Hammerberg et al.

(10) Patent No.: US 11,613,685 B2
(45) Date of Patent: Mar. 28, 2023

(54) OIL-IN-WATER MACRO-EMULSION PROCESS FOR FORMING SOLID GEL BEADS MELTABLE TO FORM A GEL PHASE CHANGE MATERIAL

(71) Applicant: MICROTEK LABORATORIES, INC., Dayton, OH (US)

(72) Inventors: Madison B. Hammerberg, Union, OH (US); Jessica P. Davis, Kettering, OH (US)

(73) Assignee: Microtek Laboratories, Inc., Dayton, OH (US)

( * ) Notice: Subject to any disclaimer, the term of this patent is extended or adjusted under 35 U.S.C. 154(b) by 800 days.

(21) Appl. No.: 16/554,498

(22) Filed: Aug. 28, 2019

(65) Prior Publication Data

US 2020/0071586 A1    Mar. 5, 2020

Related U.S. Application Data

(60) Provisional application No. 62/724,124, filed on Aug. 29, 2018.

(51) Int. Cl.
*C09K 5/06*   (2006.01)
*C08F 212/08* (2006.01)

(52) U.S. Cl.
CPC .............. *C09K 5/06* (2013.01); *C08F 212/08* (2013.01)

(58) Field of Classification Search
CPC ....................................................... C09K 5/16
See application file for complete search history.

(56) References Cited

U.S. PATENT DOCUMENTS

| | | |
|---|---|---|
| 3,933,140 A | 1/1976 | Gynn et al. |
| 4,343,158 A | 8/1982 | Campbell |
| 4,393,975 A | 7/1983 | Moore |
| 4,429,793 A | 2/1984 | Ehmann |
| 4,892,226 A | 1/1990 | Abtahi |
| 5,361,603 A | 11/1994 | Merritt-Munson |

(Continued)

FOREIGN PATENT DOCUMENTS

| | | | | |
|---|---|---|---|---|
| CN | 105542721 A | * | 5/2016 | ............... C09K 5/06 |
| FR | 2957256 A1 | | 9/2011 | |

OTHER PUBLICATIONS

Google Translation of CN 105542721 (Year: 2016).*

(Continued)

*Primary Examiner* — Hoa (Holly) Le
(74) *Attorney, Agent, or Firm* — FisherBroyles, LLP; Susan M. Oiler

(57) ABSTRACT

Solid gel beads formed from a gel product of a 5 carbon to 60 carbon alkane phase change material, 5 carbon to 60 carbon alkene phase change material, or a combination thereof and a styrene-based polymer are homogeneous, has an uneven exterior surface, and a major axis length in a range of 1000 μm to 100 mm. Methods for making the solid gel bead include providing water having a preselected temperature based on a linear relationship to the melting point of a phase change material composition, mixing the phase change material composition with the styrene-based polymer at or below the preselected temperature with stirring to form a pulp, and mixing the pulp into the water with turbulent mixing while maintaining the temperature of the mixture at the preselected temperature.

19 Claims, 6 Drawing Sheets

(56) References Cited

U.S. PATENT DOCUMENTS

| | | | |
|---|---|---|---|
| 5,490,396 | A | 2/1996 | Morris |
| 6,271,272 | B1 | 8/2001 | Carlier et al. |
| 6,412,545 | B1 | 7/2002 | Buff et al. |
| 6,695,373 | B1 | 2/2004 | Meise |
| 6,742,354 | B1 | 6/2004 | Watts |
| 8,933,139 | B1 | 1/2015 | Peterson et al. |
| 9,080,051 | B2 | 7/2015 | Peterson et al. |
| 9,534,098 | B2 | 1/2017 | Peterson et al. |
| 9,556,373 | B2 | 1/2017 | Formato et al. |
| 9,598,622 | B2 | 3/2017 | Formato et al. |
| 9,725,595 | B2 | 8/2017 | Peterson et al. |
| 2014/0087105 | A1* | 3/2014 | Formato .................. C09K 5/06 206/525 |
| 2015/0197610 | A1 | 7/2015 | Peterson et al. |
| 2016/0262979 | A1 | 9/2016 | Wengreen et al. |
| 2017/0037215 | A1 | 2/2017 | Crawford et al. |
| 2017/0073562 | A1 | 3/2017 | Peterson et al. |
| 2017/0218156 | A1 | 8/2017 | Peterson et al. |
| 2017/0247593 | A1 | 8/2017 | Formato et al. |
| 2018/0298264 | A1 | 10/2018 | Peterson et al. |

OTHER PUBLICATIONS

Listing of physical properties of various Alkanes (Year: 2000).*
PCT, International Search Report and Written Opinion; International Application No. PCT/US2019/048660 (dated Nov. 3, 2019) (7 Pages).

* cited by examiner

OIL-IN-WATER MACRO-EMULSION PROCESS FOR FORMING SOLID GEL BEADS MELTABLE TO FORM A GEL PHASE CHANGE MATERIAL

RELATED APPLICATIONS

This application claims the benefit of U.S. Provisional Application No. 62/724,124, filed on Aug. 29, 2018, the entirety of which is incorporated herein by reference.

TECHNICAL FIELD

The present application relates to a solid gel bead comprising a phase change material formed by an oil-in-water macro-emulsion process, the solid gel beads being meltable to form a gel phase change material for thermal management applications, more particularly, to a hydrocarbon wax and styrene-based polymer solid gel bead.

BACKGROUND

A phase change material (PCM) is any substance that can undergo a controlled change between phases of matter to intake, store, or release energy. The intake, storing, or releasing of energy typically has an impact on the surroundings. PCMs exist in many forms including organic, inorganic, eutectics, and solid-solid. With this wide variety, a range of temperatures for different applications can be achieved. It is important to have a PCM temperature in a workable range for the application in order to get the full charge of energy out of the system. Many hydrocarbon PCMs operate by melting and freezing to take in and release energy to the surroundings.

PCMs are useful in applications such as construction materials, bedding, textiles, bio-tech, pharmaceuticals, or electronics to provide energy and temperature management. There are three main types of delivery methods for phase changes materials: raw phase change materials, encapsulated PCMs, and gel PCMs. Gel PCMs are the type discussed herein.

KRATON™ polymers are well-known block copolymer that are used in the preparation of gelled alkanes. U.S. Pat. No. 9,556,373 teaches methods for heating the PCM above the glass transition (Tg) of the chosen grade of KRATON™ polymers and adding with viscous stirring until a viscoelastic liquid is formed. This hot liquid is then transferred into a container and cooled to mold to the shape of the selected container. While gelling and microencapsulation of PCMs have been done before, neither have been completed as a macro-emulsion in water at temperatures below 65° C.

There is a need for new and improved gel PCMS for thermal cooling or thermal management products, especially one that is easier to manufacture especially in a continuous manufacturing process.

SUMMARY

In all aspects, solid gel beads are disclosed that are formed from a gel product of a 5 carbon to 60 carbon alkane phase change material, 5 carbon to 60 carbon alkene phase change material, or a combination thereof and a styrene-based polymer and are homogeneous, have an uneven exterior surface, and a major axis length in a range of 1000 µm to 100 mm.

In all aspects, the solid gel beads are formed in an oil-in-water emulsion with turbulent mixing in the water. The water is at a preselected temperature based on a linear relationship to the melting point of the phase change material. The phase change material and the styrene-based polymer were added to the water as a pulp at a temperature below the preselected temperature of the water.

In all aspects, methods for making the solid gel beads are disclosed. The method includes providing water having a preselected temperature based on a linear relationship to the melting point of a phase change material composition expressed as $Y=0.6X+45$ ($\pm 1°$ C. up to $\pm 7°$ C.), mixing the phase change material composition comprising a 5 carbon to 60 carbon alkane phase change material, 5 carbon to 60 carbon alkene phase change material, or combinations thereof with a styrene-based polymer at or below the preselected temperature with stirring to form a pulp, and mixing the pulp into the water with turbulent mixing while maintaining the temperature of the mixture at the preselected temperature, thereby forming solid, homogenous gel beads without forming a viscoelastic liquid at any point within the process. X is the melting point of the phase change material in degrees Celsius and Y is the preselected temperature in degrees Celsius as shown in FIG. 11.

In all aspects, the styrene-based polymer is a styrene-ethylene-butylene-styrene triblock copolymer. Mixing to form the pulp is performed at standard temperature and pressure, the turbulent mixing is maintained for a period of at least 5 minutes, more preferably for 5 minutes to 30 minutes.

In all aspects, a continuous manufacturing method for making solid gel beads is disclosed. The method includes providing water having a preselected temperature based on a linear relationship to the melting point of a phase change material composition expressed as $Y=0.6X+45$ ($\pm 1°$ C. up to $\pm 7°$ C.), providing a vessel of a pulp mixture of a phase change material composition comprising a 5 carbon to 60 carbon alkane and/or a 5 carbon to 60 carbon alkene phase change material and a styrene-based polymer at or below the preselected temperature of the water, and introducing the pulp and the water into a turbulent mixer, thereby forming solid, homogenous gel beads without forming a viscoelastic liquid at any point within the process. The yield of sold gel beads is greater than 90%.

In all aspects, the continuous manufacturing method includes separating the solid gel beads from any remaining liquid such as by a continuous screen or belt filter downstream of the turbulent mixer. The turbulent mixer may be a static mixer.

In all aspects, the continuous manufacturing method includes introducing the pulp and water into the turbulent mixer at a ratio of pulp to water in a range of 2:1 to 1:3 and maintain the pulp at a temperature of 25° C. to 140° C. with mixing under standard temperature and pressure, unless pressure is required to prevent the aqueous phase from boiling.

In all aspects, in the continuous manufacturing method, the styrene-based polymer is a styrene-ethylene-butylene-styrene triblock copolymer.

In all aspects, the continuous manufacturing method may include drying the solid gel beads and distributing an allotment of dry solid gel beads into a container.

In one embodiment, the container is an end use container, and the method includes heating the end use container to melt the solid gel beads, thereby forming a liquid gel that conforms to the shape of the end use container, and subsequently, cooling the end use container to form a solid gel in the shape of the end use container.

In another embodiment, the container is a mold, and the method includes heating the mold to melt the solid gel beads, thereby forming a viscoelastic liquid that conforms to the shape of the mold, and subsequently, cooling the mold to form a solid gel in the shape of the end use container. Here, the container may be a shipping container.

In a third embodiment, the container is a plastic bag or pouch sealingly closed to retain the solid gel beads therein.

In a fourth embodiment, the container is a vessel for heating the solid gel beads and extruding therefrom a liquid resulting from heating the solid gel beads.

DETAILED DESCRIPTION

The following detailed description will illustrate the general principles of the invention, examples of which are additionally illustrated in the working and comparative examples.

As used herein, "gel" means a coherent mass consisting of a polymeric matrix in which particles too small to be seen in an ordinary optical microscope are either dispersed or arranged in a fine network throughout the mass. A gel may be notably elastic and jellylike (as gelatin or fruit jelly), or quite solid and rigid (as silica gel, a material that looks like coarse white sand and is used as a dehumidifier). Gels are colloids (aggregates of fine particles, as described above, dispersed in a continuous medium) in which, due to the surrounding network, the liquid medium has become viscous enough to behave more or less as a solid. In the Examples herein the styrene-based polymer has a polymeric matrix in which the PCM is dispersed.

Figure 2:
FIG. 2 is a photograph of a pulp (semi-homogeneous) formed by mixing 5-10% KRATON™ polymers with tetradecane at room temperature.
Figure 3:
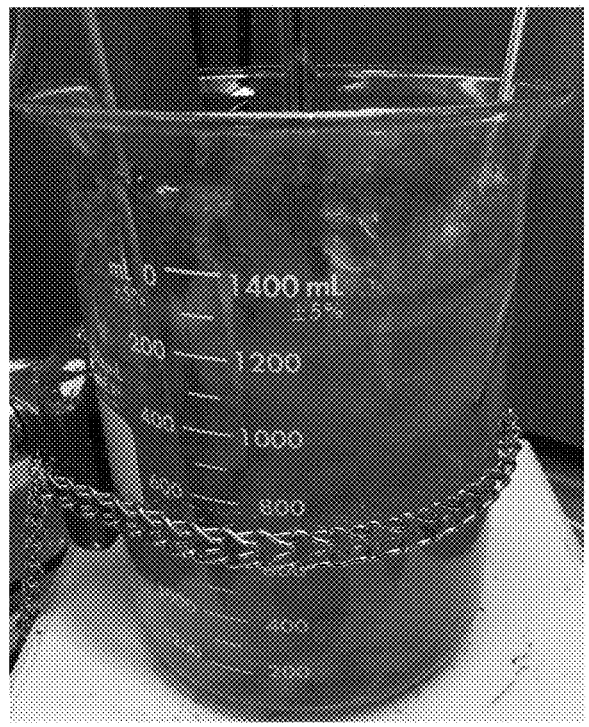
FIG. 3 is a photograph of an oil-in-water macro-emulsion of the pulp of FIG. 2 in water heated and maintained at a temperature in the range of 45° C. to 50° C.
Figure 4:
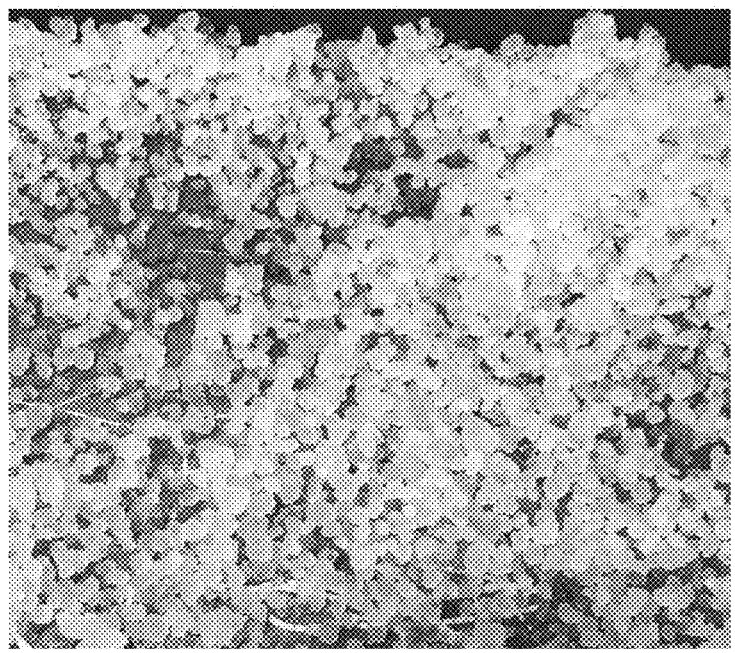
FIG. 4 is a photograph of the solid gel beads formed in the macro-emulsion of FIG. 3.

Referring now to FIGS. 2-4, a non-uniform macro-emulsion method is disclosed to create a PCM gel beads. This emulsion is being referred to as a non-uniform macro emulsion, which is an oil-in-water emulsion, simply with a large (macro) size oil droplet and a slightly irregular shape. The shape and size of the emulsion are the exact same as the final solid gel beads, which are homogenous, so the detail in describing the emulsion allows for a visualization of the final product (i.e., an uneven, irregular exterior surface of a generally spherical bead as seen in the photographs of FIGS. 4-6 and 8-9).

As shown in FIG. 2, a pulp is formed by mixing a 5C to 60C alkane or 5C to 60C alkene phase change material (C stands for "carbon"), or combinations thereof with a styrene-based polymer at or below 65° C. In one embodiment, the alkene phase change material is one that has 5C up to 26C. Then, as shown in FIG. 3, a vessel of water having a temperature within a range of 18° C. to 140° C. is provided, more preferably 25° C. to 85° C., and the pulp is mixed into the water with turbulent mixing while maintaining the temperature of the mixture within said range. If the temperature is required to go above the boiling point of water based on the process temperature equation, then the vessel should be pressurized to prevent boiling from occurring. The turbulent mixing is maintained for at least 5 minutes. The mixing may be maintained for up to 30 minutes, and if necessary the tank can be cooled back to room temperature and mixing can be maintained for a few hours until the material is processed further. Solid gel beads are formed within the water. The solid gel beads are separated from the water by any means of straining and a set aside to dry as shown in FIG. 4. In other embodiments, a pulp is formed by mixing a 10C to 22C alkene PCM, a 10C or 22C alkane, or combinations thereof with a styrene-based polymer at or below 60° C. A vessel of water having a temperature within a range of 35° C. to 75° C. is provided and the pulp is mixed into the water with turbulent mixing as described above.

The water may contain additives such as emulsifiers, aqueous surfactants, including colloidal particles to create a Pickering emulsion, rheology modifiers and thickeners. Some example surfactants include but are not limited to sulfates, sulfonates, phosphates, and carboxylate compounds. More specifically, sodium lauryl sulfate, sorbitan, polysorbate, and colloidal particles such as silica, clay, and chitosan. Some example rheology modifiers and thickeners include but are not limited to beeswax, cetyl alcohol, steryl alcohol, modified cellulose, guar gum, xanthan gum, gelatin, carbomers, and modified alkali soluble emulsions, hydrophobically modified alkali soluble emulsions, and hydrophobically modified ethylene oxide urethane rheology modifiers.

All the steps of the macro-emulsion method are performed at standard pressure unless the processing temperature requires pressure to prevent the aqueous phase from boiling. In such embodiments, pressurizing the vessel to prevent boiling is appropriate. In embodiments where the PCM has a melting point at or below room temperature, the mixing to form a pulp is performed at room temperature. Tetradecane, dodecane, pentadecane, hexadecane, heptadecane or any combination of these PCMS can be mixed with the styrene-based polymer at room temperature to form the pulp.

Example 5C to 60C alkane or 5C to 60C alkene phase change materials include, but are not limited to, dodecane, tridecane, tetradecane, pentadecane, hexadecane, heptadecane, octadecane, eicosane, and docosane, dodecene, tridecene, tetradecene, pentadecene, hexadecene, heptadecene, octadecene, and eicosene. The PCM is typically one that is slightly miscible with the polymer, meaning that the polymer will form a well-mixed pulp with the PCM as seen in FIG. 2, but the PCM will not enter the polymer matrix without further processing. However, the PCM will also not dissolve the polymer to form a viscoelastic liquid upon contact. Two target ranges for an alkane/alkene blend include: (1) −10° C. to 0° C.; and (2) 2° C. to 8° C., which are merely examples and should not be construed as limiting. An entire range of melt point temperatures is set forth in FIG. 11. For these ranges a mixture having selected relative proportions containing any number of the following waxes might be used: dodecane, tridecane, tetradecane, pentadecane, and hexadecane.

The styrene-based polymer selected for this formulation is a gelling agent and, preferably, a styrene-ethylene-butylene-styrene triblock copolymer, such as, but not limited to, KRATON™ G1654 polymers or KRATON™ G1650 polymers commercially available from Kraton Polymers LLC (Houston, Tex.). The styrene-based polymer is present as 5% to 10% by weight of the gel product with the phase change material typically being the balance thereof. KRATON™ G copolymers are thermoplastic elastomers having copolymer chains in a di-block, tri-block, or multi-arm configuration. The tri-block copolymers have styrene (S) on both ends of the chain and a rubber (e.g., ethylene propylene (EP) or ethylene butylene (EB)) in the middle whereas the di-block structure has styrene on only one end of the chain. For the tri-block structures, it is known that the rubber segments form separate domains and that the styrene segments lock together to form physical cross links. Several properties to consider in developing gels using SEBS and SEPS copolymers include styrene content, molecular weight, tri-block versus di-block, and end-use temperature.

Alternate types of thermoplastic elastomers such as styrene based thermoplastic elastomers (TPE-S) can be used. The thermoplastic elastomers are appropriate due to their rigid block copolymer structure, which can form a pulp with the phase change materials discussed above. These include styrene isoprene styrene block copolymers (SIS), hydrogenated styrene isoprene styrene block copolymers (SEPS), styrene butadiene styrene block copolymers (SBS), hydrogenated styrenic butadiene copolymers (SEBS), and styrene butadiene styrene styrene block copolymers (SBSS). However, other thermoplastic elastomers may be possible, if they form a pulp with the selected phase change material, which includes TPE-polyurethanes, TPE-polyolefins, TPE-copolyesters, TPE-copolyamides, and TPE-vulcanized rubbers.

Figure 11:
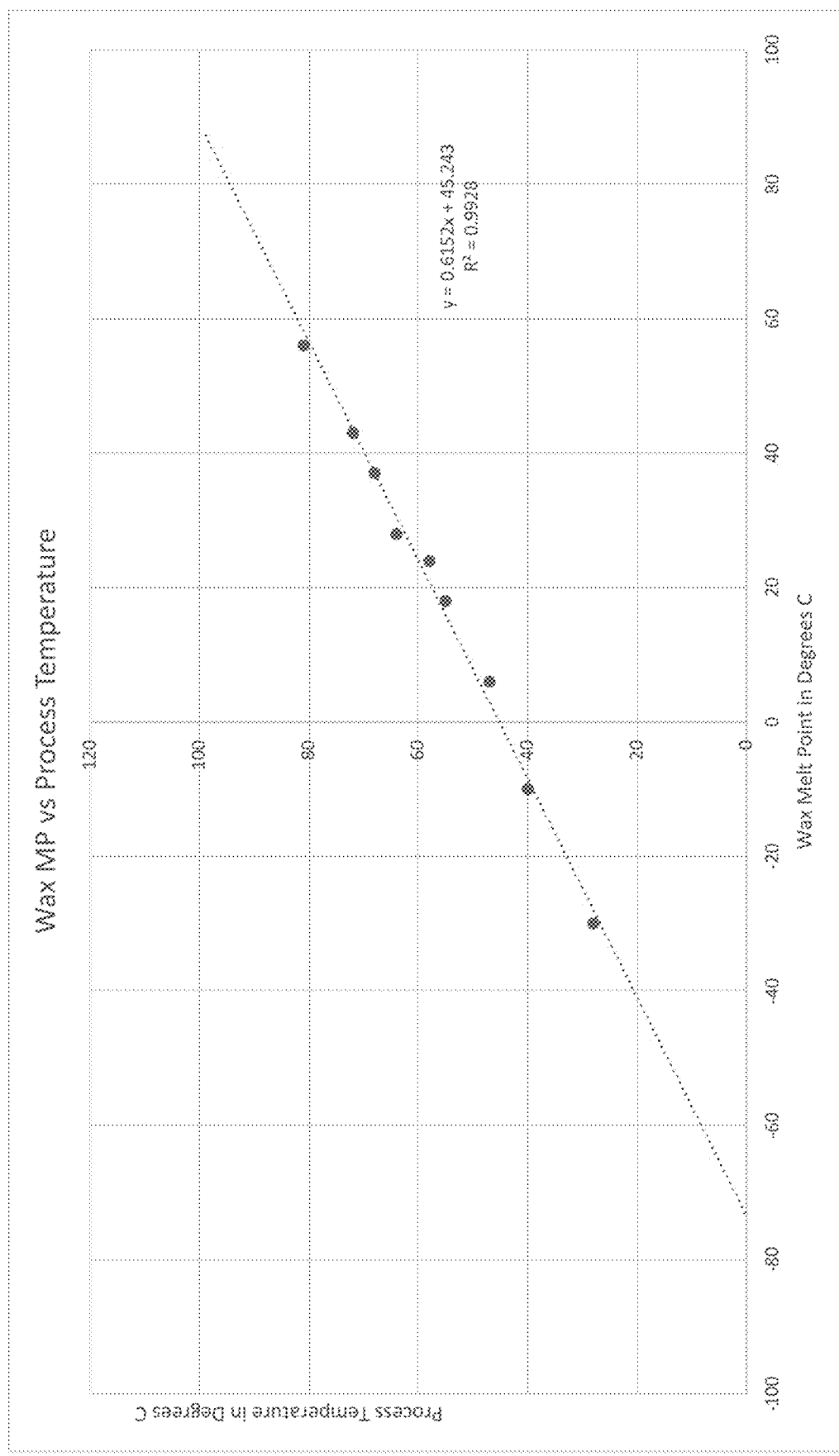
FIG. 11 is a graph showing the linear relationship for the wax melt point relative to the processing temperature of the water.

The temperature of the water is dependent on the melting point of the phase change material temperature, and, as shown by the graph in FIG. 11, it is a linear relationship. The linear relationship from FIG. 11 is expressed mathematically as $y=0.6152x+45.243$ with an $R^2$ value of 0.9928. This expression can be rounded to less significant figures as $y=0.6x+45$ and is applicable within plus or minus 1° C. up to plus or minus 7° C. Phase change materials, in particular alkane and/or alkene waxes, were tested over a range from a melting point of −30° C. to 56° C. and follow the same linear relationship indicating what process temperature in ° C. to use for the temperature of the water. In one embodiment, when the PCM or PCM blend has a melting point within a range of −10° C. to 10 C, the temperature of the water is in the range of 40° C. to 50° C., more preferably 43° C. to 48° C. In another embodiment, when the PCM or PCM blend has a melting point within a range of 18° C. to 28° C., the temperature of the water is in the range of 50° C. to 65° C., more preferably 55° C. to 64° C.

The mixing conditions of the macro-emulsion allow the formation of a completely homogenous, solid gel bead PCM without ever crossing over the glass transition temperature of the PCM styrene-based polymer blend. To illustrate the emulsion and homogenous nature of the solid gel beads, blue dye was added to the KRATON™ polymer/PCM pulp and red dye was added to the water (the aqueous phase of the emulsion). When the emulsion started to form, a purple color was observed. The solid gel beads are significantly lighter in color than the blue pulp, as shown in FIG. 4, which means that the KRATON™ polymer has fully blended with the PCM and indicates the homogenous nature of the solid gel beads. As a further test of the homogenous nature of the solid gel beads, the solid gel beads were subjected to a thermal cycling test where the solid gel beads were frozen and thawed repeatedly. The freeze-thaw test was conducted by placing the beads on a metal mesh pan with a catch basin thereunder. The beads were weighed before and after one freeze-thaw cycle, and any wax that dripped off was collected. By weight the beads lost less than 0.5% of their mass during the test. This test demonstrates that the PCM and KRATON™ polymer are gelled together as a homogenous gel product. The solid gel beads were even evidenced to shrink and swell homogenously during the freeze thaw process, all without losing their shape or decreasing their overall mass.

Turbulent mixing is used to form the emulsion of the PCM and gelling agent in water. In the laboratory setting, 1 to 4 baffles were used in combination with an axial four blade impeller set between 400-500 rpm or a Cowles blade impeller set between 500-700 rpm. Turbulent mixing can also be achieved with other methods, including but not limited to alternate impeller configurations, alternate baffle configurations and alternate mixing speed, or even alternate mixing dynamics which result in the same emulsion outcome. The settings and type of mixer used depend upon the size selected for the finished solid gel beads. The turbulent mixing should create a vortex in the center of the vessel, and the baffles should ensure turbulent flow within the system. The turbulent flow forms a non-uniform macro emulsion, which directly affects the size and shape of the finished gel beads, i.e., the gel beads are macro-sized and have non-uniform exterior surfaces. The shape of the finished beads is exactly the shape of the emulsion. The emulsion should mix between 5 to 20 minutes, where the length of time and mixing speed directly correspond to the size of the finished beads.

Turbulent mixing as used herein means flow in which the fluid undergoes irregular fluctuations, or mixing, in contrast to laminar flow, including flow in which the forming gel beads collide into one another, against the side(s) of the container, and against the mixer or baffles depending upon the type of mixer used. The collision of the beads should form eddies, fluid current whose flow direction differs from that of the general flow and as a result transfer much more energy and matter within the fluid than the molecular diffusion in nonturbulent flow, which assist with the movement of the PCM in the gel matrix. Turbulent mixing of the pulp forms an emulsion in which the bead shape forms because the PCM enters the block copolymer matrix.

Figure 10:
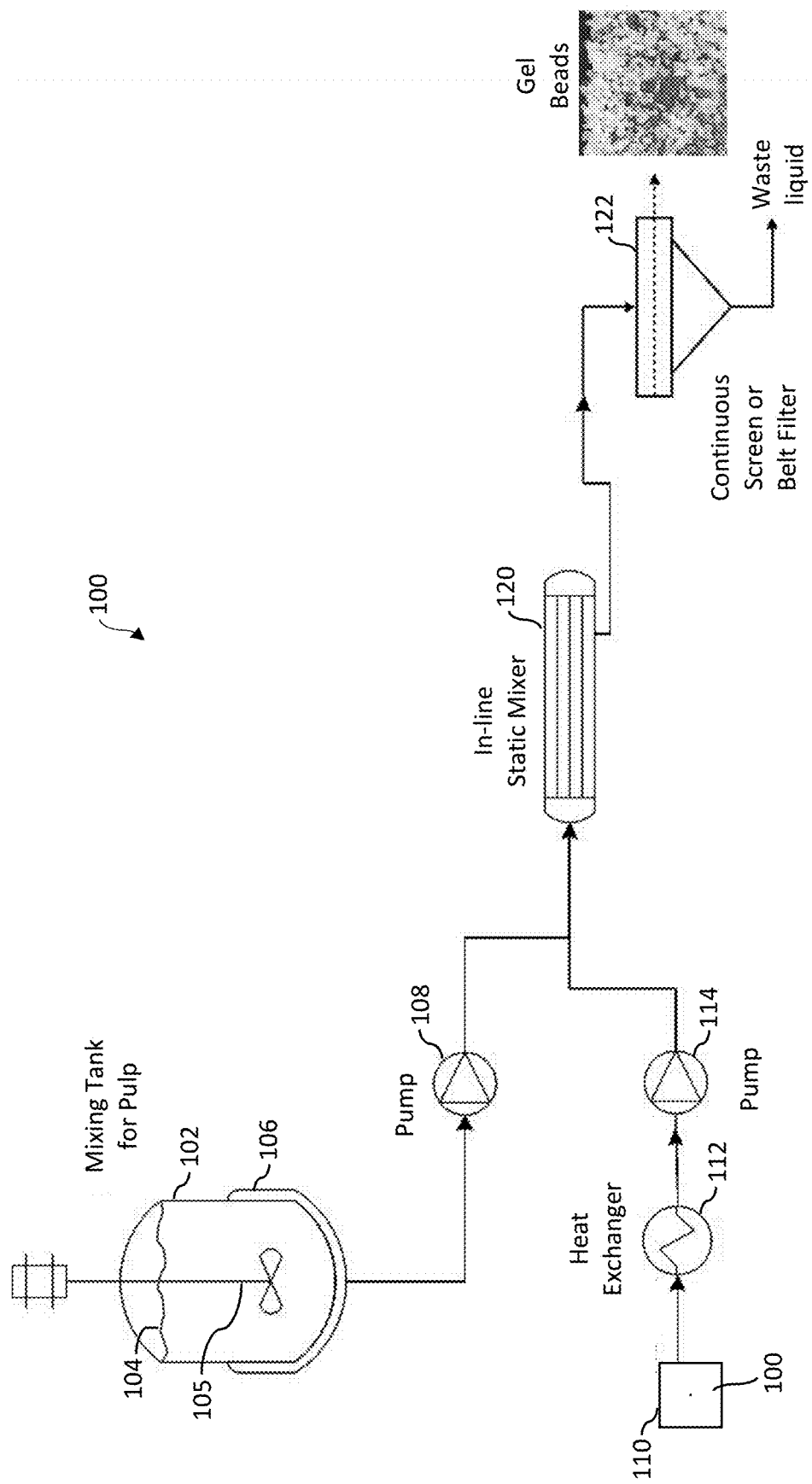
FIG. 10 is a schematic diagram of a continuous process of manufacturing the solid gel beads.

A continuous manufacturing method is described herein to produce the solid gel beads. Most known gel PCM processes are operated under batch conditions, which are costly and less efficient than a continuous manufacturing method. With reference to FIG. 10, the continuous manufacturing method provides a supply tank 102 of a pulp mixture 104 of a 5C to 60C alkane or alkene phase change material (or combination thereof) with a styrene-based polymer at or below a preselected temperature of the water. The supply tank 102 has a mixing unit 105 and may include a heating jacket 106 to maintain the pulp at a temperature at or below the preselected temperature of the water. In one embodiment, the temperature of the pulp was room temperature, i.e., no heating is required. The method includes having a source of water 110 at a preselected temperature based on the relationship shown in FIG. 11. A heating device, such as a heat exchanger 112, is in operative communication with the source of water and/or the flow of water from the source to heat the water to the preselected temperature. Next, both the pulp 104 and the water 111 are introduced into a turbulent mixer 120, thereby forming an emulsion that transitions to solid gel beads. The pulp 104 may be introduced into the turbulent mixer using a pump 108, and likewise the water 11 may be introduced into the turbulent mixer 120 using a pump 114. While pumps are illustrated in FIG. 10, the method is not limited thereto. Any known or hereinafter means of introducing the substances into the mixer can be used. The entire process can be run under pressure as necessary dependent on the processing temperature, as explained above.

Subsequent to the formation of the solid gel beads from the emulsion, the solid gel beads are separated from the remaining liquid using a separation device 122. In FIG. 10, the separation device may be a continuous screen or belt filter, or any other know or hereinafter developed means for sieving the solid gel beads form the liquid.

The turbulent mixer 120 is illustrated as an in-line static mixer. By supplying the pulp as a feed into the water stream heated to the pre-selected temperature, and then pumping the emulsion through a static in line mixer the same non-uniform macro emulsion should be formed as in a batch mixing process. The beads can then be separated from the water using belt or screen filtration. Any other know or hereinafter developed mixer capable of turbulent mixing the pulp and water can be used in place of an in-line static mixer.

After the beads are produced, they are completely homogenous and ready to use as a gel based PCM. If the beads are to remain the finished product, they can be placed into either a pliable or rigid container to be used as a PCM. In one embodiment, the solid gel beads are placed directly into a shipping container. In another embodiment, the solid gel beads are placed directly into a plastic pouch or bag and sealed therein for use as a thermal management device. The solid gel beads provide the pouch or bag with flexibility and conformity characteristics even through the phase change of the gel. However, the gel beads can also be melted down in a mold to form a desired shape based on the end application of the PCM. To melt the beads, the beads are placed in to a desired mold, which is places in an oven having a temperature sufficient to melt the beads for about 2 hours. In one embodiment, the oven temperature is in the range of 70° C. to 100° C. The beads will melt and form to the shape of the mold. Once the mold is removed from heat, the gel can be removed from the mold and will retain the shape of the mold. For example, see a before and after comparison in FIGS. 6 and 7.

In other embodiments, the gel beads may be molded using injection molding, extrusion molding, or compression molding techniques known for thermoplastics. For example, in one embodiment, the gel beads may be introduced into a vessel, heated above the glass transition temperature of the gel beads, and then extruded therefrom as a viscoelastic liquid into shapes and/or molds.

A gelled PCM has many applications regarding temperature management. It can provide cooling properties to any desired system as well as controlled heat release during the respective melt and freeze phase changes. The solid gel beads disclosed herein provide a clean and easy manufacturing process as well as a unique delivery method of the PCM, including providing a customer the option to melt and mold the PCM gels into practically any desired shapes. The solid gel beads can be inserted into a pliable or rigid container and molded therein for a variety of end applications. In one example embodiment, the gels can be housed in a container to form a cold pack, typically permanently enclosing the thermal gel therein. The container can be a rigid container that retains a preselected shape and configuration, or a flexible container that is conformable to a surface against which the flexible container is seated. A rigid container may be made of glass, metal, hard-plastic or other suitable materials. A flexible container may be made of polymer films, plastics (such as a plastic in the form of a bag), watertight fabrics, or other suitable materials.

The solid gel beads provide an alternative to encapsulated or raw PCMs, while greatly improving the process of traditional gelled PCM technologies. The solid gel beads disclosed herein provide a safer method of molding PCM wax/polymer blends. Since the solid gel beads are already homogenous, there is less PCM lost during the molding process (very little free PCM is given off during heating and cooling), thereby providing higher yields in the overall process. If a non-homogenous mixture is heated and cooled in this manner, there would inevitably be some PCM that was not properly blended with the polymer, which means that a mold using a non-homogenous mixture would have less overall enthalpy than that same mold created from the same weight of a homogenous mixture. Due to the enthalpy of a PCM being directly dependent on the cost of that PCM, the solid gel beads also creates a more cost-efficient process with a better-quality product. Further, the formulation of the solid gel beads is much simpler than microencapsulation processes and the process time is much shorter. Also, the enthalpy of the gel beads can be better than a microencapsulated PCM because there is no wall material present.

Also, the methods provide higher yields, a simpler formulation with reduced processing time, and easy scale up capabilities, including a continuous manufacturing process. The use of the oil-in-water macro-emulsion allows for unique and key distinctions in the process that provide the shorter processing time and higher yields. By using the macro-emulsion, the overall process never reaches a temperature above the glass transition temperature of the PCM styrene-based polymer mixture. The product is also completely homogenous, which in and of itself is significant because the formation of a homogenous gel is typically only reached with mixing the polymer above the glass transition temperature. Further, in certain embodiments, the blend of the PCM and the styrene-based polymer (pulp) can be completed at room temperature while still providing a completely homogenous finished product.

Advantageously, the solid gel beads are easy to work with and ship, in particular because of the ease of packaging and processing the beads.

EXAMLPLE 1

Formation of gel beads from a PCM having a melting point at or below room temperature and having a size dimension of approximately 1 mm.

Figure 8:
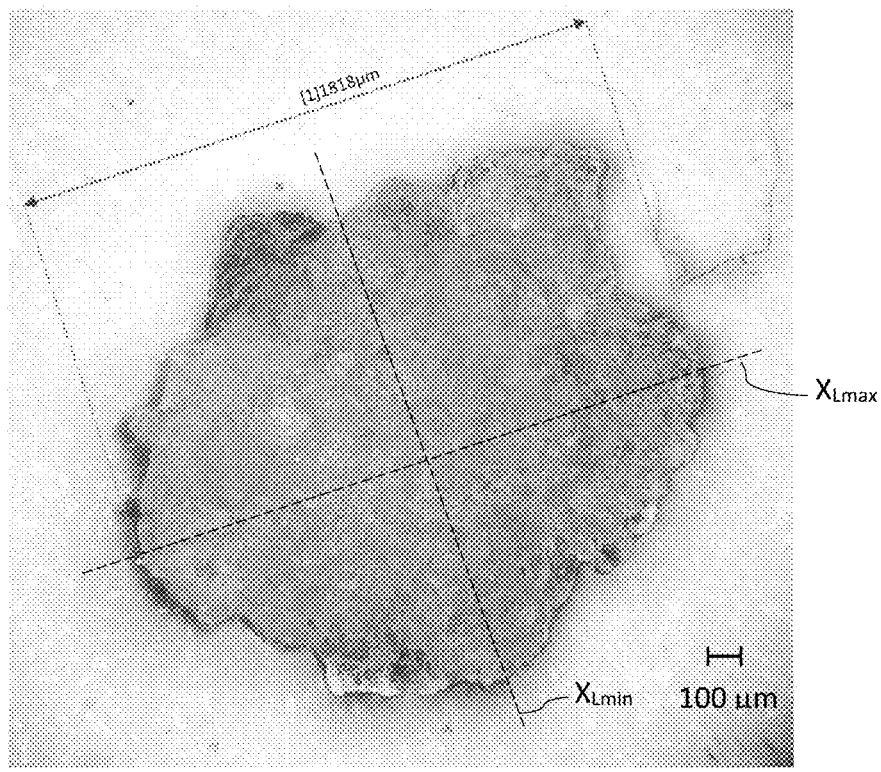
FIG. 8 is an image of a single solid gel bead enlarged to a 100 μm scale having a mid-plane length of 1818 μm.

At room temperature, 100 grams of tetradecane was mixed with 10 grams of KRATON™ G1654 polymer until a semi-homogenous pulp was formed. In a separate beaker (2 L), 800 mL of water was heated to between 45-50° C. Once the water was heated, a cowles blade turbine having a baffle was inserted into the beaker. The mixer was set at 400 rpm. Then, the semi-homogenous pulp was poured into the water slowly and the rate of mixing was increased to and then maintained at 650 rpm. A vortex was formed in the center of the beaker to mix the pulp with turbulent flow across the baffle and against itself. The water temperature and the turbulent mixing were maintained for about 15-20 minutes during which time solid gel beads formed. The water was strained from the solid gel beads, and the solid gel beads were dried. A representative solid gel bead was measured as shown in the photograph of FIG. 8 along the major axis $X_{Lmax}$, rather than along a minor axis $X_{Lmin}$. The major axis $X_{Lmax}$ of the solid gel bead measured 1818 μm.

EXAMPLE 2

Formation of gel beads from a PCM having a melting point at or below room temperature and having a size dimension of approximately 10 mm.

Figure 9:
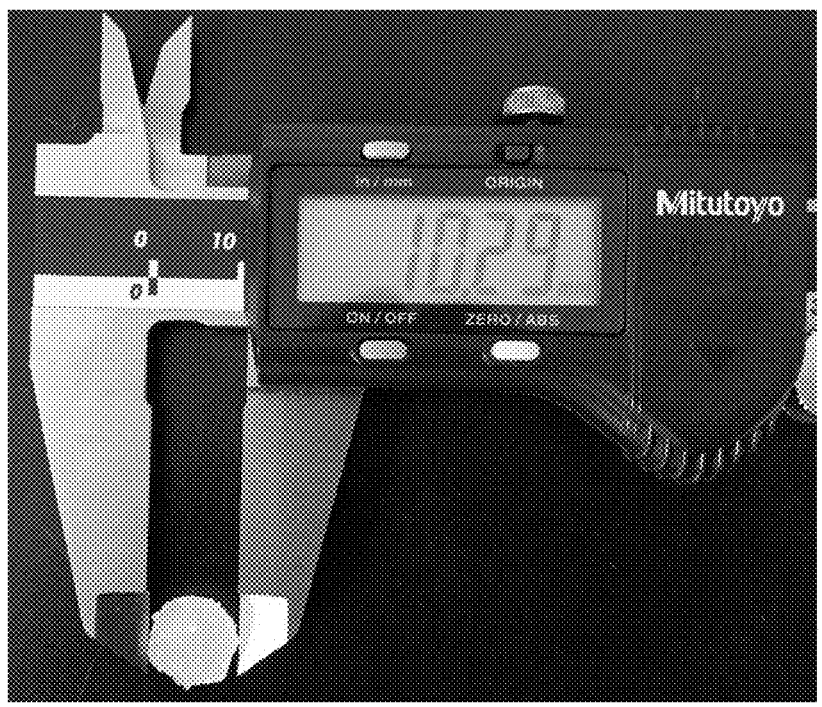
FIG. 9 is photograph of a single solid gel bead in a caliper having a display indicating a mid-plane length of 10.29 mm.

At room temperature, 100 grams of tetradecane was mixed with 10 grams of KRATON™ G1654 polymer until a semi-homogenous pulp was formed. In a separate beaker (2 L), 800 mL of water was heated to between 45-50° C. Once the water was heated, a mixer having a baffle was inserted into the beaker. The mixer was set at 200 rpm. Then, the semi-homogenous pulp was poured into the water slowly and the rate of mixing was increased to between 400-500 rpm. A vortex was formed in the center of the beaker to mix the pulp with turbulent flow across the baffle and against itself. The water temperature and the turbulent mixing were maintained for about 5 minutes during which time solid gel beads formed. The water was strained from the solid gel beads, and the solid gel beads were dried. A representative solid gel bead was measured using a caliper as shown in the photograph of FIG. 9. The major axis $X_{Lmax}$ of the solid gel bead measured 10.29 mm.

EXAMPLE 3

Formation of gel beads from a PCM having a melting point above room temperature.

Figure 5:
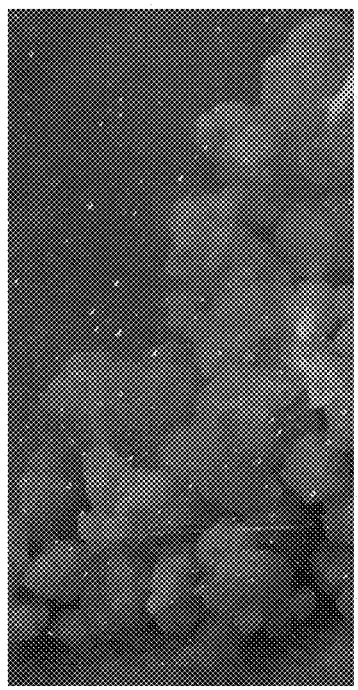
FIG. 5 is a photograph of solid gel beads formed with KRATON™ polymers and octadecane by the macro-emulsion process disclosed herein.

100 grams of octadecane was heated to a 37-43° C. to melt the wax and was mixed with 10 grams of KRATON™ G1654 polymer until a semi-homogenous pulp was formed. It should be noted that the wax and KRATON™ need to be kept below processing temperature of 50° C. to 60° C. until they are added into the emulsion, otherwise a solid gel will start to form. In a separate beaker (2 L), 800 mL of water was heated to between 50-60° C. Once the water was heated, a mixer having a baffle was inserted into the beaker. The mixer was set at 200 rpm. Then, the semi-homogenous pulp was poured into the water slowly and the rate of mixing was increased to between 400-500 rpm. A vortex was formed in the center of the beaker to mix the pulp with turbulent flow across the baffle and against itself. The water temperature and the turbulent mixing were maintained for about 5 minutes during which time solid gel beads formed. The water was strained from the solid gel beads, and the solid gel beads were dried. A photograph of some of the solid gel beads are shown in FIG. 5.

EXAMPLE 4

Molding a PCM gel from the solid gel beads of any of Examples 1-3.

Figure 6:
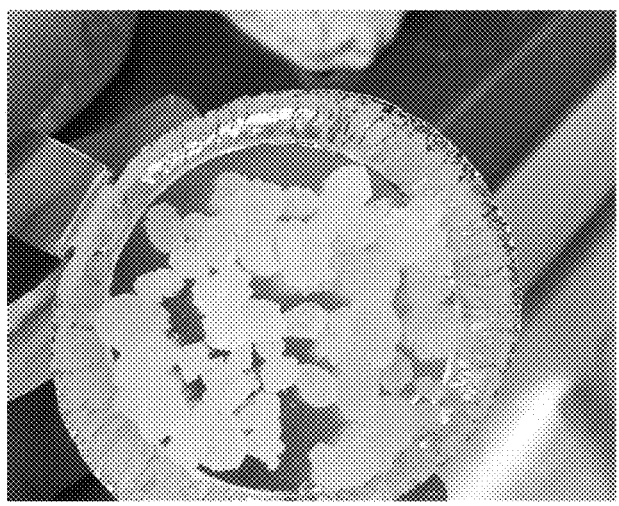
FIG. 6 is a photograph of some of the solid gel beads from the photograph of FIG. 4 placed in an aluminum foil dish prior to heating to melt the solid gel beads.
Figure 7:
FIG. 7 is a photograph of a gel formed after heating and then cooling the aluminum foil dish with solid gel beads of FIG. 6.

A sample of the solid gel beads from each of Examples 1-3 was placed into a separate mold of a desired shape. As shown in FIG. 6, the mold used was an aluminum foil cup. The aluminum foil cup was placed in an oven set to between 80-90° C. for about 2 hours. Thereafter, the aluminum foil cup was removed from the oven and cooled. Once cooled, the shaped gel was removed from the mold as shown in FIG. 7.

COMPARATIVE EXAMPLE 1

Figure 1:
FIG. 1 is a photograph of a viscoelastic liquid phase change gel made by a prior art process disclosed in U.S. Pat. No. 9,556,373.

For a comparison, a PCM gel was prepared using a prior art method from U.S. Pat. No. 9,556,373—heating the PCM wax, here tetradecane, to 90° C. and mixing the KRATON™ G1654 polymer together until homogenous, which forms a viscoelastic liquid as shown in FIG. 1. The resulting mixture was then poured into a mold container having a desired final shape for the PCM gel. The viscoelastic nature of this material is hard to work with and the mixture cools to a solid quickly, which produces low yields, because a significant amount of material sticks to the equipment and the beaker.

Table 1 below is a comparison of yield results from the prior art material of comparative example 1 and the solid gel beads of Example 1. The results are calculated from the total weight of KRATON™ G1654 polymer and tetradecane in the beaker compared to the total weight of useable material out of each system in the molded state. There was a 13.5% increase in yield by means of the nonuniform macro emulsion. It should be stated that the KRATON™ polymer and PCM used for each method were the same materials and lot numbers, and the experiments were performed as stated above for the prior are and in example 1 for the PCM gel beads.

TABLE 1

Yield Comparison Between Example 1 and Comparative Example 1

| | Mass In | Mass Out | % Yield |
|---|---|---|---|
| Comparative Example 1 | 440.22 g | 376.42 | 85.5% |
| Example 1 Solid Gel Beads | 96.19 g | 94.97 | 98.7% |

Having described the invention in detail and by reference to specific embodiments and examples, it will be apparent that numerous modifications and variations are possible without departing from the spirit of the invention as defined by the following claims.

What is claimed is:
1. A method for making solid gel bead, the method comprising:
providing water having a preselected temperature based on a linear relationship to the melting point of a phase change material composition expressed as Y=0.6X+45 (±1° C. up to ±7° C.), wherein X is the melting point of the phase change material in degrees Celsius and Y is the preselected temperature in degrees Celsius;
mixing the phase change material composition comprising a 5 carbon to 60 carbon alkane phase change material, 5 carbon to 60 carbon alkene phase change material, or combinations thereof with a styrene-based polymer at or below the preselected temperature with stirring to form a pulp;
mixing the pulp into the water with turbulent mixing while maintaining the temperature of the mixture at the preselected temperature, thereby forming solid, homogenous gel beads without forming a viscoelastic liquid at any point within the process;
separating the solid, homogeneous gel beads from any remaining liquid.

2. The method of claim 1, wherein the styrene-based polymer is a styrene-ethylene-butylene-styrene triblock copolymer.

3. The method of claim 2, wherein an emulsion is created under pressure.

4. The method of claim 1, wherein mixing to form the pulp is performed at standard temperature and pressure.

5. The method of claim 1, wherein the turbulent mixing is maintained for a period of at least 5 minutes.

6. The method of claim 1, wherein the turbulent mixing is maintained for 5 minutes to 30 minutes.

7. A continuous manufacturing method for making solid gel beads, the method comprising:
   providing a source of water having a preselected temperature based on a linear relationship to the melting point of a phase change material composition expressed as Y=0.6X+45 (±1° C. up to ±7° C.), wherein X is the melting point of the phase change material in degrees Celsius and Y is the preselected temperature in degrees Celsius;
   providing a vessel of a pulp mixture of a phase change material composition comprising a 5 carbon to 60 carbon alkane and/or a 5 carbon to 60 carbon alkene phase change material and a styrene-based polymer at or below the preselected temperature of the water;
   introducing the pulp and the water into a turbulent mixer, thereby forming solid, homogenous gel beads without forming a viscoelastic liquid at any point within the process;
   separating the solid gel beads from any remaining liquid;
   drying the solid gel beads; and
   distributing an allotment of dry solid gel beads into a container.

8. The method of claim 7, wherein separating comprises a continuous screen or belt filter downstream of the turbulent mixer.

9. The method of claim 7, wherein the turbulent mixer is a static mixer.

10. The method of claim 7, wherein providing a source of water comprises heating the water prior to introducing the water into the turbulent mixer.

11. The method of claim 7, wherein the pulp in the vessel is maintained at a temperature of 25° C. to 140° C. with mixing.

12. The method of claim 7, wherein the pulp is mixed and maintained at standard temperature and pressure.

13. The method of claim 7, wherein the styrene-based polymer is a styrene-ethylene-butylene-styrene triblock copolymer.

14. The method of claim 7, wherein the method has yield greater than 90%.

15. The method of claim 7, wherein the container is an end use container, and the method further comprises:
   heating the end use container to melt the solid gel beads, thereby forming a liquid gel that conforms to the shape of the end use container; and
   subsequently, cooling the end use container to form a solid gel in the shape of the end use container.

16. The method of claim 7, wherein the container is a mold, and the method further comprises:
   heating the mold to melt the solid gel beads, thereby forming a viscoelastic liquid that conforms to the shape of the mold; and
   subsequently, cooling the mold to form a solid gel in the shape of the end use container.

17. The method of claim 7, wherein the container is a shipping container.

18. The method of claim 7, wherein the container is a plastic bag or pouch sealingly closed to retain the solid gel beads therein.

19. The method of claim 7, wherein the container is a vessel for heating the solid gel beads and extruding therefrom a viscoelastic liquid resulting from heating the solid gel beads above the glass transition temperature thereof.

* * * * *

UNITED STATES PATENT AND TRADEMARK OFFICE
CERTIFICATE OF CORRECTION

PATENT NO. : 11,613,685 B2  
APPLICATION NO. : 16/554498  
DATED : March 28, 2023  
INVENTOR(S) : Hammerberg et al.

Page 1 of 1

It is certified that error appears in the above-identified patent and that said Letters Patent is hereby corrected as shown below:

On the Title Page

Under References Cited, '3,933,140 A 1/1976 Gynn et al' should read -8,933,140 B2 1/2015 PETERSON et al.-

Page 2, under References Cited, '6,695,373 B1 2/2004 Meise' should read -8,695,373 B1 4/2014 PATTON- Signed and Sealed this  
Twenty-third Day of May, 2023

Katherine Kelly Vidal  
*Director of the United States Patent and Trademark Office*